Sept. 25, 1962     J. A. HENDERSON     3,055,808
HERMETICALLY SEALED PETRI DISH
Filed July 23, 1959
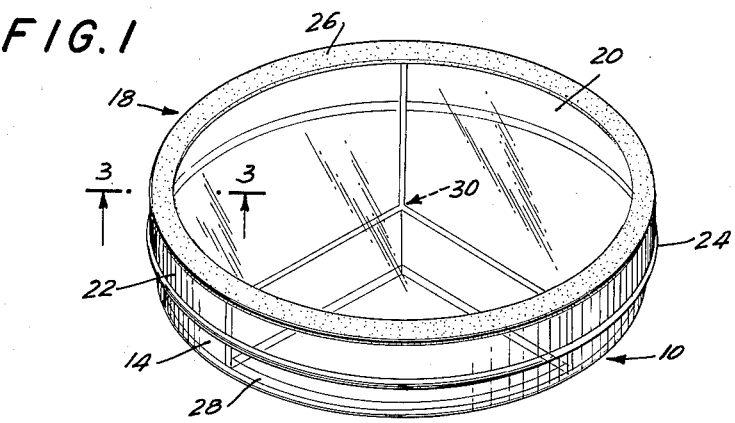
FIG.1
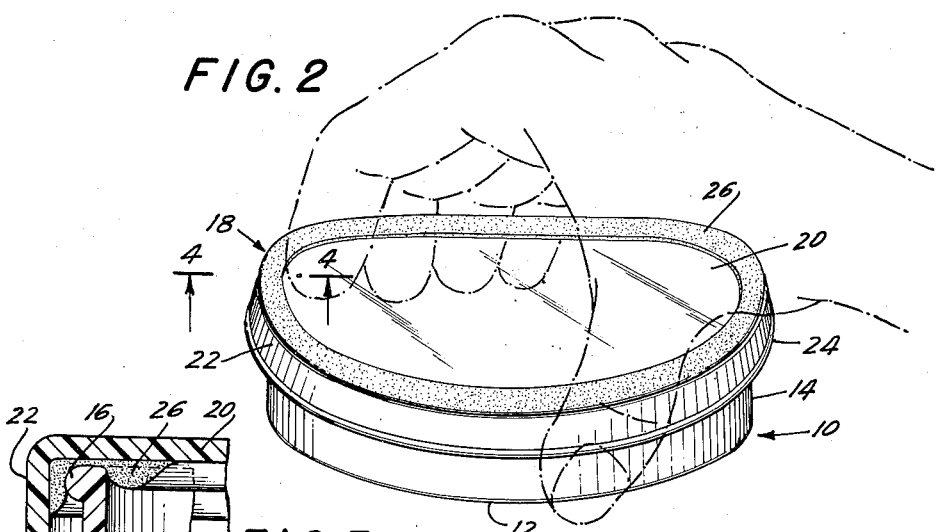
FIG.2
FIG.3
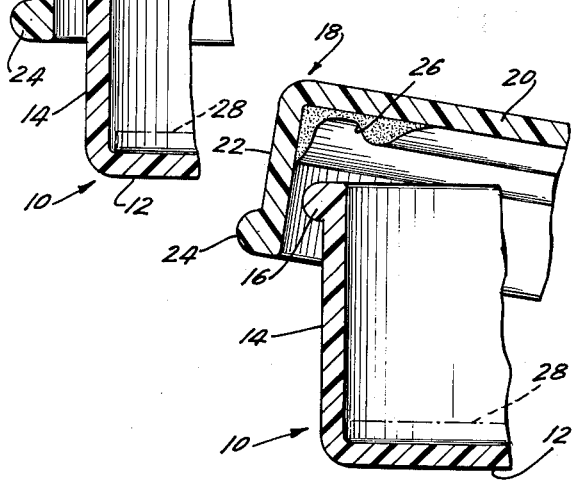
FIG.4
INVENTOR.
JOHN A. HENDERSON
BY
Hane, Dalsimer and Kane
ATTORNEYS

United States Patent Office 3,055,808
Patented Sept. 25, 1962

3,055,808
HERMETICALLY SEALED PETRI DISH
John A. Henderson, Highland Park, N.J., assignor to Baltimore Biological Laboratory, Inc., Baltimore, Md., a corporation of Maryland
Filed July 23, 1959, Ser. No. 829,082
4 Claims. (Cl. 195—139)

This invention relates to a structurally and functionally improved Petri dish, and more particularly to a Petri dish having a superior seal which is capable of maintaining a sterile environment within the dish.

An object of this invention is to provide a dish, generally in the nature of the Petri type, with a cover which is adapted to be releasably and hermetically sealed to the dish in such a manner that only deliberately applied pressure can relieve such seal, thereby assuring, under substantially all conditions of use, abuse, storage and shipment, the desired environmental conditions within the enclosure defined by the assembled dish and cover.

Another object is to provide a culturing dish with an improved seal with its cover such that contamination of the interior of the dish and any culturing medium supported therein is prevented; but, nevertheless, access to such interior is facilitated for such purposes as inoculation of any contained culturing medium with certain organisms, by only selectively and deliberately applied pressures which relieve the seal between the dish and its cover, which parts may then be resealed, if desired.

A Petri dish assembly, as herein disclosed, may be disposed of after a single use; and accordingly the parts thereof are readily and economically manufactured at minimum cost and effectively assembled by employing relatively inexpensive and efficient techniques.

Other objects and advantages will become apparent from the following detailed description which is to be taken in conjunction with the attached sheet of drawings illustrating a preferred embodiment, and in which:

FIG. 1 is a perspective view of a Petri dish and cover in their assembled positions with the dish having a number of compartments for receiving one or more culturing media;

FIG. 2 is a similar perspective view illustrating the application of finger pressure to the depending walls of the cover to break and render ineffective the seal between the dish and cover;

FIG. 3 is an enlarged fragmentary sectional view taken along the line 3—3 of FIG. 1 for purposes of showing a seal between the dish and cover, which seal incorporates the teachings of the present invention;

FIG. 4 is a similar sectional view taken along the line 4—4 of FIG. 2 illustrating the releasing of the seal between the dish and cover.

In accordance with the present invention, a Petri dish 10, having a substantially shallow cylindrical configuration, includes a base 12 and depending side wall 14. The upper peripheral edge of this depending side wall 14 is formed with outwardly protruding lip 16.

The dish 10 is most advantageously provided with a cover 18 which is of substantially the same shape as dish 10 but is somewhat shallower and possesses a substantially greater diameter so that it can fit loosely over the open upper end of dish 10. Thus, the cover 18 embodies a top 20 with depending side wall 22 which terminates in an outwardly projecting lip 24 extending along the entire periphery of wall 22.

Under most circumstances, it is preferable that the dish 10 and cover 18 be formed from a transparent material possessing some degree of flexibility and resiliency. Additionally, the material selected should be capable of withstanding the usual environmental conditions as well as changes to which the ordinary Petri dish is subjected. In this connection, many of the commercial resins may be employed such as polystyrene, polyethylene, polyvinylchloride and cellulose acetate.

The inner face of top 20 of cover 18 presents a sealing means 26 which extends circumferentially along the periphery of such face for cooperating with lip 16 of dish 10. Under such circumstances, it is preferred that the surfaces of sealing means 26, that are to be associated with lip 16 in providing a seal between the dish 10 and cover 18, be adhesive in nature; and, to this end, this adhesive should be of the type that is pressure-sensitive and permanently tacky. However, the material from which the sealing means 26 is formed should be capable of withstanding the contemplated use and ordinarily encountered abuse during storage and shipping. In this connection, sealing means 26 should be expected to retain its desired characteristics even during and subsequent to normal incubation at temperatures ranging from 25° to 60° C. The eventual seal provided should prevent contamination of the space enclosed by dish 10 and cover 18, as well as deterioration of the dish contents for approximately six months to a year or more. Consequently, the material possessing the desired degree of adhesiveness should not set-up during these periods of time and the aforementioned environmental conditions.

Thus, a sealing means 26 having pressure-sensitive and permanently tacky adhesive characteristics may take the form of a ring, gasket or tape which can have both of their opposed side faces possessing such adhesiveness such that they may be secured to the inner face of top 20 of cover 18 as well as adjacent sectors of side wall 22. On the other hand, suitable materials for sealing means 26 may include soft, deformable microcrystalline wax compositions having a melting point between about 50–65° C. Such compositions may be made from a micro-crystalline wax having a melting point (A.S.T.M. D-127) of between about 130 to 150° F. and a penetration (A.S.T.M. D-1321) of between about 35 to 50, to which about 7–13% of an isobutylene polymer soluble in the molten wax is added. A typical composition found to be suitable and having these characteristics is Darex thermoplastic compound No. 38491–G supplied by Dewey and Almy Chemical Division of W. R. Grace & Co., Cambridge, Massachusetts. In this connection, such a composition is brought to its molten state and poured at approximately 150° F. along the desired sectors of the inner face of top 20, sidewall 22 and their juncture, and subsequently air dried. The application of the molten wax to the desired location of the cover 18 can be accomplished by utilizing a stationary nozzle and imparting rotation to the cover 18 about a substantially fixed axis. Such wax compositions are extremely satisfactory for effecting a superior seal between the dish 10 and cover 18 because of the ability of such compositions to mold about lip 16, and compensate for any surface irregularities of the associated sectors of lip 16.

As illustrated, the dish 10 is ordinarily partially filled with a culturing medium 28 which usually partakes of a gel-like consistency. Other materials may be added to the medium to support the growth of particular organisms if desired, as well as to provide a reduction indicator. Obviously, depending upon the particular and contemplated conditions and requirements, as well as the particular organisms to be cultivated, the culturing medium 28 is a variable. Some of the agars embodied by the present invention includes Tripticase soy broth agar, blood plate used for routine growth to discover organisms inhabiting a specimen, Eugan agar for hemolytic studies and sensitivity tests with antibiotic discs, Mueller Hinton agar for sensitivity with the sulphas, streptomycin, assay agar for plate assays of antibiotics, tellurite glycine agar for cultivation of pathogenic coagulase-positive cocci, thioglycollate medium for cultivation of aerobic and anaerobic organisms, desoxycholate agar for the cultivation of gram-negative enteric bacilli, and dextrose agar for the cultivation of pathogenic organisms.

It is additionally contemplated that a single dish 10 can be utilized with more than one culturing medium 28 contained therein to cultivate one or more specimens of the same or different organisms. Under such circumstances, a system of dividing walls or partitions 30 can be employed to divide the interior of dish 10 to more than one compartment. As illustrated, these partitions 30 can assume the form of radial ribs to effect such division.

Subsequent to the application of the sealing means 26 to the cover 18, the dish 10, as well as cover 18, are gas sterilized. If a culturing medium is to be placed within the dish 10 in the first instance, this dish will be aseptically filled with such medium. The cover 18 is then assembled on the dish 10 aseptically, and the assembled structure, consequently, will be available for either utilization storage or shipment as may be the case.

In view of the foregoing, the numerous aforenoted objects and advantages are most effectively attained. Therefore, it is intended that the disclosed invention is, in no sense, limited by the embodiments illustrated and described and is to be determined by the scope of the appended claims.

I claim:

1. In combination with a dish adapted to contain a culture medium and being generally in the nature of a shallow cylinder, said dish having an upper, circumferentially extending, cover-sealing peripheral edge; a cup-shaped cover on said dish having the same shape but of a greater diameter to fit loosely thereon, said cover including a top having an outer circumferentially extending periphery having inner surfaces, a depending side wall defining a corner with said top extending laterally and integrally from the outer periphery of said top; a pressure-sensitive, permanently tacky adhesive for releasably attaching said cover to said dish and hermetically sealing the juncture between said dish and cover, said adhesive material extending circumferentially along said upper peripheral edge of said dish and circumferentially along said inner surfaces of said outer periphery of said top at said corner, said adhesive being removable therewith from said dish, and said cover being formed from flexible material and so constructed as to flex in response to lateral pressures applied to said depending side wall and thusly release the seal present between said cover and said dish, with said adhesive carried entirely by said cover upon removal of said cover from said dish.

2. The invention in accordance with claim 1 wherein said cover and dish are formed from transparent resinous material.

3. The invention in accordance with claim 1 wherein divider means are mounted in said dish for providing a plurality of compartments each of which is adapted to contain a culture medium.

4. The invention in accordance with claim 1 wherein said dish and cover are sterile, said culture medium is aseptically mounted in said dish, and said adhesive hermetically sealing the juncture between said dish and cover to prevent contamination of said culture medium.

References Cited in the file of this patent

UNITED STATES PATENTS

| 2,348,448 | Brewer | May 9, 1944 |
| 2,677,646 | Lovell et al. | May 4, 1954 |
| 2,874,091 | Fish | Feb. 17, 1959 |
| 2,971,892 | Carski | Feb. 14, 1961 |

FOREIGN PATENTS

| 387,795 | Great Britain | Feb. 16, 1933 |